July 13, 1965 E. M. BRADLEY 3,195,115

MAGNETIC DATA STORAGE DEVICES

Filed July 13, 1962

INVENTOR
EDWARD MICHAEL BRADLEY
BY Kane and Nydick
ATTORNEYS 3,195,115
Patented July 13, 1965

United States Patent Office 3,195,115

MAGNETIC DATA STORAGE DEVICES

Edward Michael Bradley, Stevenage, England, assignor to International Computers and Tabulators Limited Filed July 13, 1962, Ser. No. 209,574
Claims priority, application Great Britain, July 19, 1961, 26,141/61
4 Claims. (Cl. 340—174)

Figure 1:
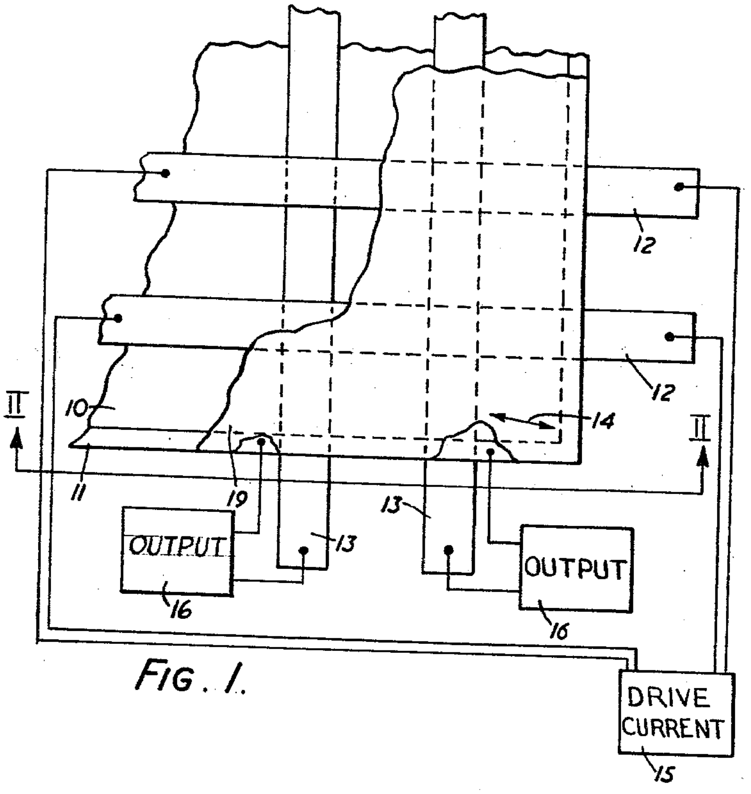

This invention relates to information storage devices utilising thin ferromagnetic films.

Various forms of information storage element utilising a thin ferromagnetic film are described in an article entitled "Computer Memories" by J. A. Rajchman, published in the proceedings of the Institute of Radio Engineers for January 1961, pages 104–127. The main advantages of thin film storage elements as compared with conventional magnetic storage cores, twistor storage elements etc., are the high switching speed and the simplification of the construction of matrix stores due to the fact that the drive and sense conductors do not have to be threaded through, or wound round, the magnetic elements.

The article referred to above also mentions the use of fixed stores in computers and information handling equipment. As its name implies, the information in the store is predetermined and no writing facilities are provided for altering the stored information. The stored information is usually determined by the construction of the store. A fixed store using a core matrix, for example, may have a sense winding which is linked only with certain cores, or the sense winding may be conventionally arranged but certain cores are omitted from the matrix.

A fixed store may be used for storing semi-permanent information such as sub-routines for microprogramming, mathematical tables or the 'dictionary" which is necessary in a computer used for language translation. A fixed store may also be used to provide code conversion facilities.

The advantages arising from the elimination of writing facilities in a fixed store are the saving in equipment and the prevention of accidental erasure of the stored information due to an incorrect address being written into a programme.

It is an object of the invention to provide a fixed store using ferromagnetic film storage elements.

It is another object of the invention to provide a fixed store in which the information content of a part, or the whole, of the store may be changed readily.

According to the invention a non-erasable store for binary information includes a plurality of spaced apart storage elements each of which consists of an area of thin ferromagnetic film with mutually perpendicular hard and easy axes of magnetisation and which is switchable primarily by domain rotation; each storage element being provided with a sense conductor responsive to change of flux in the direction of the easy axis of the storage element; elements of permanently magnetised material positioned adjacent to at least some of the storage elements such that a bias field with a component in the easy axis direction is applied to these storage elements; and means for applying to all of the storage elements a drive field with a major component in the hard axis direction to induce signals in the sense conductors representative of the previous magnetic states of the corresponding elements, the elements returning to said previous magnetic states on removal of the drive field.

According to one aspect of the invention a non-erasable store for binary information includes a plurality of spaced apart bistable storage elements each of which consists of an area of thin ferromagnetic film with mutually perpendicular hard and easy axes of magnetisation, first binary values being stored by storage elements in a first stable magnetic state and second binary values being stored by storage elements in a second stable magnetic state; each storage element being provided with a sense conductor responsive to change of flux in the easy axis direction of the storage element; elements of permanently magnetised material positioned adjacent each storage element such that a bias field with a component of one polarity in the easy axis direction is applied to each of the storage elements in said first state and a bias field with a component of the opposite polarity in the easy axis direction is applied to each of the storage elements in said second state; and means to apply to said storage elements a driving field substantially in the hard axis direction to induce signals in the sense conductors representative of the previous state of the corresponding storage elements; the bias field causing the storage elements respectively to return to their previous states on cessation of the drive field.

According to another aspect of the invention a non-erasable store for binary information includes a plurality of spaced apart bistable storage elements each of which consists of an area of thin ferromagnetic film with mutually perpendicular hard and easy axes of magnetisation, said storage elements storing a first binary value when in a first stable magnetic state and storing a second binary value when in a second stable magnetic state; each storage element being provided with a sense conductor responsive to change of flux in the easy axis direction of the storage element; elements of permanently magnetised material positioned adjacent each of said storage elements which are in said first stable state such as to apply a bias field having a component in the easy axis direction to those storage elements; and means to apply to each storage element a drive field having a major component in the hard axis direction and a minor component in the easy axis direction opposed to said bias field component to induce signals in the sense conductors representative of the previous magnetic states of the corresponding storage elements; storage elements previously in said second state returning to said second state and storage elements having a bias field applied being returned by said bias field to said first state on removal of the drive field.

According to yet another aspect of the invention a non-erasable store for binary information includes a number of groups of spaced apart storage elements, each storage element consisting of an area of thin ferromagnetic film with mutually hard and easy axes of magnetisation; a separate sense conductor coupled to each group of storage elements and responsive to change of flux in the easy axis direction of each storage element of the group; a plurality of elements permanently magnetised material positioned adjacent at least some of the storage elements such as to apply a bias field having a component in the easy axis direction to these elements; and means for applying to a selected element in each group a drive field having a major component in the hard axis direction to induce in each sense conductor a signal representative of the previous magnetic state of the selected element in the group coupled to that sense conductor; said selected storage elements returning to their previous magnetic states on removal of the drive field.

According to a further aspect of the invention a non-erasable store for binary information includes a planar thin film of ferromagnetic material with mutually perpendicular hard and easy axes of magnetisation; a plurality of spaced apart parallel first conductors lying substantially parallel to the easy axis and a plurality of spaced apart second conductors extending perpendicular to said first conductors and defining at each crossover an area of film forming a bi-stable storage element; and elements of magnetised material positioned adjacent at least some of the storage elements to apply to those storage elements a bias field having a component in the easy direction effective to determine the stable state of those elements.

Figure 2:
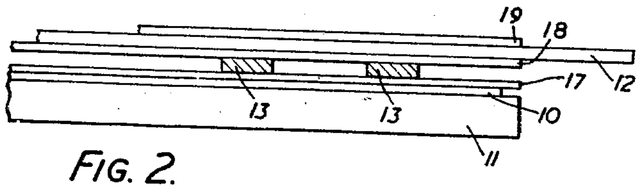

The invention will be described by way of example with reference to an embodiment illustrated in the accompanying drawings in which:

FIGURE 1 is a part plan view of a non-erasable store according to the invention and FIGURE 2 is a section on the line II—II of FIGURE 1.

The arrangement of the non-erasable storage is generally similar to that of an erasable thin film store described in an article entitled "Making Reproducible Magnetic-Film Memories" by E. M. Bradley in "Electronics" for September 1960, vol. 33 No. 37, pages 78–81. Briefly, this store consists of an aluminium substrate carrying a continuous ferromagnetic film and a matrix pattern of read and write conductors. The area of film adjacent to each intersection of the conductor matrix forms an individual binary storage element. The conductor matrix consists of spaced apart digit drive conductors, a parallel set of sense conductors, and a spaced apart set of word drive conductors which are perpendicular to the digit drive conductors. The word drive conductors are at a small angle to the easy axis of the film.

The non-erasable store shown in the drawings utilises a ferromagnetic film 10, of the kind employed in the erasable store referred to above, carried on an aluminium substrate 11. A conductor matrix, formed by word drive conductors 12 and sense conductors 13 only, is positioned to extend across the film with the sense conductors 13 lying nearest to the film and being connected (not shown) at one end to the aluminium substrate 11. The conductors and film are insulated from one another by insulation layers 17, 18. The substrate thus provides a return path for the sense conductors so as to form pick-up loops coupled to the film 10. The direction of the easy axis of magnetisation of the film is indicated by arrow 14 and the direction of the hard axis of magnetization is perpendicular thereto. The word drive conductors 12 extend at a small angle, for example 5°, to the easy axis and the sense conductors 13 are perpendicular to the drive conductors 12. The areas of film lying adjacent to the cross overs of the drive and sense conductors form bistable storage elements of which the magnetisation vector normally lies along the easy axis. If a sufficiently large current pulse is now caused to flow through a selected one of the word drive conductors 12 by a driving current source 15, the magnetisation vectors of those storage elements coupled to the selected conductor are rotated by the magnetic field generated by the current in the drive conductor from the easy direction toward a direction perpendicular to that drive conductor. The resultant flux change in a storage element induces a voltage pulse in the sense conductor 13 coupled thereto, the polarity of the voltage pulse being indicative of the original direction of the vector along the easy axis, as described in the article by Bradley referred to hereinbefore. Hence the signals induced in the sense conductors coupled to the driven storage elements indicate the information originally stored in those elements and these signals are passed to an output device 16, for example, a reading amplifier.

In order to retain the information in the store it is necessary to ensure that the magnetisation vectors return to their original positions when the drive current ceases. This is effected by applying a permanent bias field to the storage elements. This field has a component along the easy axis such that it determines the direction in which the vector rotates as the drive field decays. The magnitude of the bias field is not critical, since the upper limit is set only by the fact that a relatively large field will reduce the rotation produced by the drive field, with a resultant decrease in the voltage induced in the sense conductor.

Since the drive field is at an angle to the hard axis, all the storage elements tend to be reset to the same state on cessation of the drive field as described in the article by Bradley. Consequently, it is necessary to provide a permanent bias field for only those storage elements which must remain in the opposite state, conveniently referred to as the "1" state. However, if desired the drive conductors 12 may be arranged parallel to the easy axis and then a permanent bias field is applied to each of the storage elements.

In a preferred form of the invention, the permanent bias fields are provided by magnetised areas on a section of conventional magnetic recording tape 19 which is mounted with one face in contact with, or close to, the conductor array. The area of the tape which is adjacent to each intersection of the conductor matrix is magnetised, the direction of magnetisation being such that the stray field acts in one direction or the other along the easy axis of the storage element, in accordance with the binary state which the element is required to store. The stray field is not uniform over the area of the storage element, but this does not prevent correct operation of the store, since the value of the bias field is not critical.

Conveniently, the edges of the tape are parallel to the drive conductors so that if the conductors are at an angle to the easy axis and the tape is magnetised parallel to the edge of the tape, the bias field acts at a small angle to the easy axis. Nevertheless, the component of the field in the direction of the easy axis is sufficient.

The tape may be clamped in position on the store plate by any convenient means, such as a non-magnetic backing plate. This allows the tape to be removed and replaced by another section of tape having a different pattern of magnetised areas, thereby changing the stored information. If the stored information is to be permanent, the tape may be secured in position by a suitable adhesive.

In the foregoing description it has been assumed that the storage elements had been previously set into the required states representing the stored information. It will be apparent that the information may be entered into the store by placing the required pattern of magnetised elements adjacent the thin film and applying a drive current to each of the drive conductors so that on cessation of the drive current the storage elements are set to the required states. Alternatively the storage elements may be set by a sufficiently strong bias field only.

One of the advantages of a non-erasable store constructed in accordance with the invention, is that it is operationally compatible with an erasable thin film store. It has been found that the packing density of the storage elements is substantially the same for the erasable and non-erasable stores, so that the spacing of the conductors may be the same in the two stores.

The use of magnetic recording tape to provide the permanent bias field is convenient since the tape is readily available and enables the stored information to be changed by a simple replacement of the tape. A continuous non-magnetic carrier with suitably positioned discrete magnetic elements may be used instead of the tape. The carrier may be a sheet of synthetic plastic, for example, with the magnetic elements in the form of dots of a material consisting of iron oxide in a suitable binder, such as one of the compositions used for coating magnetic tapes or magnetic storage drums. Alternatively, the magnetic elements may be small sections of magnetisable wire embedded in the plastic material, or discrete metallic areas capable of being permanently magnetised. The metallic areas may be produced by electrodeposition, or by etching of a continuous metallic layer adhering to the plastic material.

Magnetic elements of the kind referred to above may be secured or deposited on an insulating layer formed over the conductor matrix, if the stored information is to be truly permanent. Alternatively, a thicker magnetic film may be produced on this insulating layer, by vacuum deposition or electrodeposition, the magnetic characteristics of this film being such that the required areas may be permanently magnetised and will retain their magnetisation despite the stray fields of the drive conductors.

I claim:

1. A non-erasable store for binary information including a group of storage elements, each storage element consisting of an area of thin ferromagnetic film with mutually perpendicular hard and easy axes of magnetisation and which is switchable primarily by domain rotation; a separate sense conductor coupled to each of the storage elements respectively, each sense conductor being responsive to change of magnetic flux in the direction of the easy axis of the storage element coupled thereto; a plurality of elements of permanently magnetised material positioned one adjacent each storage element to apply to each storage element a bias field having a component aligned with the easy axis; and means to apply a drive field having a major component in the hard axis direction to all the storage elements to induce signals in the sense conductors representative of the previous magnetic states of the elements, the bias field being effective to return the storage elements to their previous magnetic states on termination of the drive field.

2. A non-erasable store for binary information including a first set of storage elements, a second set of storage elements, said storage elements each consisting of an area of thin ferromagnetic film with mutually perpendicular hard and easy axes of magnetisation and which is switchable primarily by domain rotation; a separate sense conductor coupled to each of the storage elements respectively, each sense conductor being responsive to change of magnetic flux in the direction of the easy axis of the storage element coupled thereto; a plurality of elements of permanently magnetised material positioned one adjacent each storage element of the first set to apply to the storage elements of the first set a bias field having a component in a first direction aligned with the easy axis; and means to apply a drive field having a major component in the hard axis direction and a minor component in a second direction opposite to said first direction to all the storage elements to induce signals in the sense conductors representative of the previous magnetic states of the storage elements, the bias fields being effective to return storage elements of the first set to a first stable magnetic state and the minor component of the drive field being effective to return storage elements of the second set to a second stable magnetic state.

3. A non-erasable store for binary information including a plurality of groups of storage elements, each storage element consisting of an area of thin ferromagnetic film with mutually perpendicular hard and easy axes of magnetisation and which is switchable primarily by domain rotation; a plurality of sense conductors, each sense conductor being coupled to one element in each group and being responsive to change of magnetic flux in the direction of the easy axis of the elements coupled thereto; elements of permanently magnetised material positioned one adjacent each storage element to apply to each storage element a bias field having a component aligned with the easy axis; and means to apply a drive field having a major component in the hard axis direction to all the storage elements of a selected one of said groups to induce signals in the sense conductors representative of the previous magnetic states of the elements in the selected group, the bias fields being effective to return the storage elements of the selected group to their previous magnetic states on termination of the drive field.

4. A non-erasable store for binary information including a planar continuous thin film of ferromagnetic material with mutually perpendicular hard and easy axes of magnetisation; a plurality of spaced parallel first conductors lying substantially parallel to the easy axis and a plurality of spaced second conductors extending perpendicular to said first conductors, said first and second conductors lying parallel to the plane of the thin ferromagnetic film and defining at each cross over an area of such film forming a bistable storage element; and elements of permanently magnetised material positioned adjacent a group of said storage elements to apply to storage elements of the group a bias field having a component in the easy direction effective to determine the stable state of the storage elements of the group.

References Cited by the Examiner

UNITED STATES PATENTS

| | | | |
|---|---|---|---|
| 3,070,783 | 12/62 | Pohm | 340—174 |
| 3,113,297 | 12/63 | Dietrich | 340—174 |

IRVING L. SRAGOW, *Primary Examiner.*